(12) United States Patent
Park et al.

(10) Patent No.: US 10,982,076 B2
(45) Date of Patent: Apr. 20, 2021

(54) RUBBER COMPOSITION FOR TIRE TREAD AND TIRE MANUFACTURED USING SAME

(71) Applicant: HANKOOK TIRE CO., LTD., Seoul (KR)

(72) Inventors: Ji Hyun Park, Daejeon (KR); Ki Hyun Kim, Daejeon (KR)

(73) Assignee: HANKOOK TIRE CO., LTD.

( * ) Notice: Subject to any disclaimer, the term of this patent is extended or adjusted under 35 U.S.C. 154(b) by 69 days.

(21) Appl. No.: 16/186,456

(22) Filed: Nov. 9, 2018

(65) Prior Publication Data

US 2019/0352489 A1 Nov. 21, 2019

(30) Foreign Application Priority Data

May 21, 2018 (KR) .................. 10-2018-0057671

(51) Int. Cl.
*C08L 9/06* (2006.01)
*C08K 3/36* (2006.01)
*B60C 1/00* (2006.01)

(52) U.S. Cl.
CPC .............. *C08L 9/06* (2013.01); *B60C 1/0016* (2013.01); *C08L 2205/025* (2013.01); *C08L 2205/035* (2013.01)

(58) Field of Classification Search
CPC ..................................... C08L 9/06; B60C 1/00
USPC ......................................................... 524/318
See application file for complete search history.

(56) References Cited

U.S. PATENT DOCUMENTS

| | | | |
|---|---|---|---|
| 5,981,781 A * | 11/1999 | Knowlton ................ | A23D 9/00 554/224 |
| 6,448,318 B1 | 9/2002 | Sandstrom | |
| 7,335,692 B2 | 2/2008 | Vasseur et al. | |
| 2004/0127617 A1 | 7/2004 | Vasseur et al. | |
| 2008/0314484 A1 * | 12/2008 | Nishioka ............... | B60C 1/0016 152/209.1 |
| 2010/0113703 A1 | 5/2010 | Houjo et al. | |
| 2013/0096248 A1 | 4/2013 | Thompson et al. | |
| 2014/0135437 A1 * | 5/2014 | Sandstrom ............ | B60C 1/0016 524/313 |
| 2016/0075864 A1 * | 3/2016 | Takeda ................... | C08L 15/00 523/156 |
| 2016/0272796 A1 * | 9/2016 | Washizu .................. | C08L 9/06 |

FOREIGN PATENT DOCUMENTS

| | | | |
|---|---|---|---|
| EP | 0561761 A1 | | 9/1993 |
| EP | 1782966 A1 | | 5/2007 |
| EP | 3109065 A1 | | 12/2016 |
| JP | 4602082 B2 | | 12/2010 |
| JP | 2014205748 A | | 10/2014 |
| JP | 2014205749 A | | 10/2014 |
| JP | 2014214297 A | | 11/2014 |
| JP | 2015196814 A | | 11/2015 |
| JP | 2018123305 A | | 8/2018 |
| KR | 20090112995 | * | 10/2009 |
| KR | 20120059118 | * | 6/2012 |
| KR | 101444114 B1 | | 9/2014 |
| KR | 101829555 B1 | | 3/2018 |

OTHER PUBLICATIONS

Extended European Search Report for Application No. 18206247.1 dated Jul. 8, 2019.

Kamal-Eldin, Afaf et al., "A Multivariate Study of the Correlation Between Tocopherol Content and Fatty Acid Composition in Vegetable Oils", JAOCS, vol. 74, No. 4 (1997), pp. 375-380.

* cited by examiner

*Primary Examiner* — Deve V Hall

(74) *Attorney, Agent, or Firm* — Renaissance IP Law Group LLP

(57) ABSTRACT

The present disclosure relates to a rubber composition for a tire tread, the rubber composition comprising 100 parts by weight of a raw material rubber, 10 to 30 parts by weight of a vegetable oil having a weight ratio of linolenic acid to oleic acid of 1:0.5 to 1:1.5, 10 to 20 parts by weight of a terpene-based resin having a softening point of 110 to 130° C., and 75 to 120 parts by weight of a reinforcing filler, and a tire manufactured using the rubber composition for the tire tread. The present disclosure provides a tread rubber composition for four seasons which improves the braking performance on the ice and snow road surface and the abrasion resistant performance and improves the braking performance on the wet road surface at the same time while minimizing a drop in rotational resistance.

6 Claims, No Drawings

RUBBER COMPOSITION FOR TIRE TREAD AND TIRE MANUFACTURED USING SAME

CROSS-REFERENCE TO RELATED APPLICATION

This patent application claims the benefit of priority under 35 U.S.C. 119 of Korean Patent Application No. 10-2018-0057671, filed on May 21, 2018, the contents of which are hereby incorporated by reference for all purposes as if fully set forth herein.

BACKGROUND

1. Technical Field

The present disclosure relates to a rubber composition for a tire tread, the rubber composition which simultaneously improves braking performance on a wet road surface and braking performance on an ice and snow road surface, and a tire manufactured using the rubber composition for the tire tread.

Description of Related Art

Required performance for an automotive industry has recently been deepened as concerns and specialized knowledge of consumers on cars and tires are increased, and related products are diversified. A major market of the automotive industry is mainly divided into European market and North American market, wherein handling or braking performance-oriented performance aspects are mainly required in the European market, and aspects such as stability and durability are mainly required in the North American market. According as the European market has been introducing a system of marking a label for tire performance since 2012, information on the written grades has been provided to the consumers by writing grades for braking performance on the wet road surface, low fuel consumption performance, and noises that are the most important performances. Therefore, new products have recently been developed mainly based on label marked performances even in a tire industry. Accordingly, it is a situation that needs to somewhat overcome abrasion resistant performance showing a trade-off tendency in which the other performance becomes disadvantageous when one performance is selected. Further, as a demand of the automotive industry in the North American market has become more active, it is a state that required performance for abrasion resistant performance has been significantly increased around the globe. The tire industry has been gradually growing into tires for four seasons along with development in the North American market in an environment that tires of the European market have conventionally been divided into tires for the summertime and tires for the wintertime.

In general, wear performance, braking performance on the wet road surface and braking performance on the ice and snow road surface are contrary to each other. The braking performance on the wet road surface can be improved by increasing the content of rubber with a high styrene content, or silica, i.e., a reinforcing agent. Since a high content of silica increases hardness and modulus of rubber, the high content of silica tends to rather lower excellent braking performance on the ice and snow road surface at a low hardness of rubber. Further, although the braking performance on the wet road surface is advantageous at a high glass transition temperature even in a glass transition temperature (Tg) aspect, wear performance and braking performance on the ice and snow road surface are advantageous at a low glass transition temperature that is more flexible.

It is required to develop a tire which overcomes such a trade-off phenomenon, and has improved abrasion resistant performance and braking performance on the ice and snow road surface and improved braking performance on the wet road surface at the same time.

SUMMARY

The present disclosure provides a rubber composition for a tire tread, the rubber composition which overcomes the trade-off phenomenon, and simultaneously improves the braking performance on the wet road surface and the braking performance on the ice and snow road surface.

The present disclosure also provides a tire manufactured using the rubber composition for the tire tread.

To solve the problem, an aspect of the present disclosure provides a rubber composition for a tire tread, the rubber composition comprising 100 parts by weight of a raw material rubber, 10 to 30 parts by weight of a vegetable oil having a weight ratio of linolenic acid to oleic acid of 1:0.5 to 1:1.5, 10 to 20 parts by weight of a terpene-based resin having a softening point of 110 to 130° C., and 75 to 120 parts by weight of a reinforcing filler.

The raw material rubber may include 5 to 20 wt % of a natural rubber, 40 to 70 wt % of a solution polymerized styrene-butadiene rubber, and 20 to 40 wt % of a neodymium butadiene rubber which does not contain oil with respect to the total weight of the raw material rubber.

The solution polymerized styrene-butadiene rubber may include 20 to 50 wt % of styrene, 10 to 40 wt % of vinyl and 20 to 40 wt % of an SRAE oil and have a glass transition temperature of −50 to −20° C., and the neodymium butadiene rubber may include 94 to 96 wt % of cis and have a glass transition temperature of −110 to −100° C.

The vegetable oil is any one selected from the group consisting of sunflower oil, soybean oil, canola oil, grape seed oil, and a mixture thereof, and may include 60 to 90 wt % of an unsaturated fatty acid with respect to the total weight of the vegetable oil.

The terpene-based resin is any one selected from the group consisting of a terpene resin, a terpene phenol resin, and a combination thereof, and may have a weight average molecular weight of 40 to 20,000 g/mol.

The reinforcing filler includes 70 to 100 parts by weight of silica and 5 to 20 parts by weight of carbon black with respect to the raw material rubber, the silica is a high dispersible silica having a nitrogen surface area per gram of 160 to 180 m$^2$/g, a CTAB value of 150 to 170 m$^2$/g, and a DBP oil absorption amount of 180 to 200 cc/100 g, and the carbon black may have a nitrogen surface area per gram of 30 to 300 m$^2$/g and a DBP oil absorption amount of 60 to 180 cc/100 g.

The rubber composition for the tire tread may further comprises 0.5 to 2.0 parts by weight of a vulcanizing agent, 1.0 to 2.5 parts by weight of a vulcanization accelerator, and 1 to 5 parts by weight of an antiaging agent with respect to 100 parts by weight of the raw material rubber.

Another aspect of the present disclosure provides a tire manufactured using the rubber composition for the tire tread.

The rubber composition for the tire tread according to the present disclosure and the tire manufactured using the rubber composition for the tire tread overcome a trade-off phenomenon, and can simultaneously improve the braking performance on the wet road surface, the abrasion resistant performance, and the braking performance on the ice and snow road surface.

The present disclosure provides a tread rubber composition for four seasons which improves the braking performance on the ice and snow road surface and the abrasion resistant performance and improves the braking performance on the wet road surface at the same time while minimizing a drop in rotational resistance.

DESCRIPTION OF EXEMPLARY EMBODIMENTS

Hereinafter, the present disclosure will be described more in detail.

The present disclosure provides a rubber composition for a tire tread, the rubber composition comprising 100 parts by weight of a raw material rubber, 10 to 30 parts by weight of a vegetable oil having a weight ratio of linolenic acid to oleic acid of 1:0.5 to 1:1.5, 10 to 20 parts by weight of a terpene-based resin having a softening point of 110 to 130° C., and 75 to 120 parts by weight of a reinforcing filler.

The raw material rubber may include a natural rubber, a solution polymerized styrene-butadiene rubber, and a neodymium butadiene rubber which does not contain oil.

The natural rubber may be a general natural rubber or a modified natural rubber. Examples of the general natural rubber may include any material which has been known as the natural rubber, and country of origin and the like of the general natural rubber are not limited. The natural rubber includes cis-1,4-polyisoprene as a main body, but may include trans-1,4-polyisoprene depending on required properties. Therefore, the natural rubber may include a natural rubber including trans-1,4-isoprene as a main body such as balata or the like that is a type of South American Sapotaceae rubber in addition to the natural rubber including cis-1,4-polyisoprene as the main body.

The natural rubber may be included in an amount of 5 to 20 wt %, more preferably 5 to 15 wt % with respect to the total weight of the raw material rubber. Intrinsic properties of the natural rubber having a crystallization structure are insignificant when the natural rubber is included in an amount of less than 5 wt %, and a problem that is disadvantageous in the aspect of compatibility with a synthetic rubber may be generated when the natural rubber is included in an amount of more than 20 wt %.

It is preferable that the solution polymerized styrene-butadiene rubber which has been simultaneously used includes 20 to 50 wt % of styrene, 10 to 40 wt % of vinyl and 20 to 40 wt % of an SRAE oil, and has a glass transition temperature of −50 to −20° C.

Braking performance on a dry surface or a wet surface can be improved at the same time since hysteresis of the tire tread is increased when a styrene-butadiene rubber having the foregoing properties is used.

The solution polymerized styrene-butadiene rubber may have a weight average molecular weight (Mw) of 1,200,000 to 1,700,000 g/mol and a molecular weight distribution value of 1.5 or more. Therefore, the solution polymerized styrene-butadiene rubber is excellent in processability since the solution polymerized styrene-butadiene rubber has a wide molecular weight distribution value. The solution polymerized styrene-butadiene rubber can be advantageous also in abrasion resistant performance since the solution polymerized styrene-butadiene rubber also has a high molecular weight.

The solution polymerized styrene-butadiene rubber may be included in an amount range of 40 to 70 wt % with respect to the total parts by weight of the raw material rubber. Both effects of abrasion resistant performance and the braking performance on the wet road surface or the ice and snow road surface can be increased or decreased when the content of the solution polymerized styrene-butadiene rubber is deviated from the range.

Another raw material rubber that has been used includes a neodymium butadiene rubber (Nd—BR), and the neodymium butadiene rubber may include 94 to 96 wt % of cis and have a glass transition temperature of −110 to −100° C.

The neodymium butadiene rubber (Nd—BR) is advantageous in the rotational resistance since the neodymium butadiene rubber (Nd—BR) has a narrower molecular weight distribution than a cobalt butadiene rubber (Co—BR) or a nickel butadiene rubber (Ni—BR), and has a linear molecular structure, thereby having a low hysteresis heat loss. Further, the neodymium butadiene rubber (Nd—BR) is also advantageous in the braking performance on the ice and snow road surface since the neodymium butadiene rubber (Nd—BR) among components of the raw material rubber has the lowest glass transition temperature (Tg).

The neodymium butadiene rubber is further characterized in that it does not include oil.

The neodymium butadiene rubber (Nd—BR) may be included in an amount of 20 to 40 wt % with respect to the total weight of the raw material rubber. Abrasion resistant performance and low fuel consumption performance are disadvantageous when less than 20 wt % of the neodymium butadiene rubber is included, and processability may be lowered when more than 40 wt % of the neodymium butadiene rubber is included.

To solve a trade-off problem of a general tire, a resin and a vegetable oil having an unsaturated fatty acid have been applied to the rubber composition for the tire tread according to the present inventive concept. The rubber composition for the tire tread according to the present disclosure has improved abrasion resistant performance and the braking performance on the ice and snow road surface by additionally including the vegetable oil, and has improved the braking performance on the wet road surface by additionally applying the resin at the same time.

Further, the vegetable oil used in the present disclosure is any one selected from the group consisting of sunflower oil, soybean oil, canola oil, grape seed oil, and a mixture thereof, and may include 60 to 90 wt % of an unsaturated fatty acid with respect to the total weight of the vegetable oil.

The vegetable oil has a ratio of linolenic acid to oleic acid of 1:05 to 1:1.5 in the unsaturated fatty acid.

A trade-off is generated in aspects of the braking performance on the wet road surface and rotational resistance performance although the braking performance on the ice and snow road surface and abrasion resistant performance are excellent when less than 0.5 part by weight of the oleic acid is included with respect to 1 part by weight of the linolenic acid. On the contrary, effects of the braking performance on the ice and snow road surface and the abrasion resistant performance are insignificant although a trade-off phenomenon is insignificant when more than 1.5 part by weight of the oleic acid is included with respect to 1 part by weight of the linolenic acid. There is a problem that the braking performance on the wet road surface is lowered since a compound has a low glass transition temperature when the vegetable oil is applied. The problem has been complemented by applying a terpene-based resin for improving the problem.

The vegetable oil preferably has a weight molecular weight (Mw) of 1,000 g/mol or more, and may have a glass transition temperature of −70 to −40° C.

Further, the vegetable oil is preferably included in an amount of 10 to 30 parts by weight with respect to 100 parts by weight of the raw material rubber. There may be a problem that effects of the wear performance and the braking performance on the ice and snow road surface are insignificant when less than 10 parts by weight of the vegetable oil is included, and there may a problem that the rotation resistance and the braking performance on the wet road surface are excessively lowered when more than 30 parts by weight of the vegetable oil is included.

The terpene-based resin further improves tack performance between rubbers, and improves mixability, dispersibility and processability of other additives such as the reinforcing filler, thereby contributing to improvements in properties of the rubber.

A problem that the braking performance on the wet road surface is lowered may occur since the rubber composition has a low glass transition temperature when the vegetable oil is applied to a tire rubber composition. On the other hand, a problem caused by the vegetable oil can be solved since the terpene-based resin has a glass transition temperature near 0° C. such that the braking performance on the wet road surface can be improved.

The terpene-based resin may be any one selected from the group consisting of a terpene resin, a terpene phenol resin, and a combination thereof.

The terpene-based resin preferably has a softening point of 20 to 160° C., and may have a weight molecular weight (Mw) of 40 to 2,000 g/mol.

The terpene-based resin is preferably included in an amount of 10 to 20 parts by weight with respect to 100 parts by weight of the raw material rubber. Rotational resistance and abrasion resistant performance may be more disadvantageous than an effect of improving the braking performance on the wet road surface although the braking performance on the wet road surface can be improved when more than 20 parts by weight of the terpene-based resin is included.

The reinforcing filler used in the present disclosure is preferably used in the form of a combination of silica and carbon black. Additionally, a silane coupling agent for improving dispersibility of silica may be further used.

The reinforcing filler may be included in an amount of 75 to 120 parts by weight with respect to 100 parts by weight of the raw material rubber.

When a mixture of silica and carbon black is used as the reinforcing filler, the silica is preferably included in an amount of 70 to 100 parts by weight with respect to 100 parts by weight of the raw material rubber. There is a problem that the braking performance is low when less than 70 parts by weight of the silica is included, and there is a problem that the abrasion resistant performance and low fuel consumption performance are disadvantageous when more than 110 parts by weight of the silica is included.

When the mixture of silica and carbon black is used as the reinforcing filler, the carbon black may be included in an amount of 5 to 20 parts by weight with respect to 100 parts by weight of the raw material rubber. A reinforcing property effect is insignificant when less than 5 parts by weight of the carbon black is included, and a drop in the braking performance on the ice and snow road surface may be generated due to a reduction in rotational resistance and an excessive increase in reinforcing properties when more than 20 parts by weight of the carbon black is included.

The silica is preferably a high dispersible silica having a nitrogen surface area per gram (N2SA) of 160 to 180 $m^2$/g, a CTAB value of 150 to 170 $m^2$/g, and a DBP oil absorption amount of 180 to 200 cc/100 g to obtain a tread rubber composition suitable for the purpose of the present disclosure.

The silane coupling agent includes bis-(3-triethoxysilylpropyl)disulfide (TESPD), bis-(3-triethoxysilylpropyl)tetrasulfide (TESPT), and the like in an alkoxy polysulfide silane compound, and TESPD is obtained by blending 50% of TESPT with 50% of carbon black. The silane coupling agent is preferably used in an amount of 10 to 20 parts by weight with respect to 100 parts by weight of the raw material rubber.

Although the carbon black may have a nitrogen surface area per gram (N2SA) of 30 to 300 $m^2$/g and a n-dibutyl phthalate (DBP) oil absorption amount of 60 to 180 cc/100 g, the nitrogen surface area per gram (N2SA) and the DBP oil absorption amount of the carbon black according to the present disclosure are not limited thereto.

Processability of the rubber composition for the tire may be disadvantageous when the carbon black has a nitrogen surface area per gram of more than 300 $m^2$/g, and reinforcing performance of the carbon black that is a filler may become disadvantageous when the carbon black has a nitrogen surface area per gram of less than 30 $m^2$/g. Further, the processability of the rubber composition may be lowered when the carbon black has a DBP oil absorption amount of more than 180 cc/100 g, and the reinforcing performance may become disadvantageous due to the carbon black that is the filler when the carbon black has a DBP oil absorption amount of less than 60 cc/100 g.

Typical examples of the carbon black may include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990, N991, or the like.

The rubber composition for the tire tread may further comprise various additives which are selectively additional including a vulcanizing agent, a vulcanization accelerator, a vulcanization acceleration aid, an antiaging agent, and others. The various additives may include any materials if the materials are commonly used in the art to which the present disclosure pertains, and the contents of the additives are not particularly limited since contents of the additives depend on a mixing ratio commonly used in the rubber composition for the tire tread.

The vulcanizing agent may preferably include a sulfur-based vulcanizing agent. Examples of the sulfur-based vulcanizing agent may include: an inorganic vulcanizing agent such as a sulfur (S) powder, an insoluble sulfur (S), a precipitated sulfur (S), a colloidal sulfur, or the like; and an organic vulcanizing agent such as tetramethylthiuram disulfide (TMTD), tetraethylthiuram disulfide (TETD), dithiodimorpholine, or the like. Specifically, the sulfur vulcanizing agent may include a vulcanizing agent for preparing element sulfur or sulfur, e.g., amine disulfide, polymer sulfur, or the like.

The vulcanizing agent included in an amount of 0.5 to 2.0 parts by weight with respect to 100 parts by weight of the raw material rubber is desirable in that the vulcanizing agent makes the raw material rubber less sensitive to heat and allows the raw material rubber to be chemically stable as suitable vulcanizing effects.

The vulcanization accelerator means an accelerator which accelerates vulcanization rate or accelerates delayed action in the initial vulcanization step.

The vulcanization accelerator may be any one selected from the group consisting of a sulfenamide-based vulcanization accelerator, a thiazole-based vulcanization accelerator, a thiuram-based vulcanization accelerator, a thiourea-based vulcanization accelerator, a guanidine-based vulcanization accelerator, a dithiocarbamate-based vulcanization accelerator, an aldehyde amine-based vulcanization accelerator, and an aldehyde ammonia-based vulcanization accelerator, an imidazoline-based vulcanization accelerator, a xanthate-based vulcanization accelerator, and a combination thereof.

Examples of the sulfenamide-based vulcanization accelerator may include any one sulfenamide-based compound selected from the group consisting of N-cyclohexyl-2-benzothiazyl sulfenamide (CBS), N-tert-butyl-2-benzothiazyl sulfenamide (TBBS), N,N-dicyclohexyl-2-benzothiazyl sulfenamide, N-oxydiethylene-2-benothiazyl sulfenamide, N,N-diisopropyl-2-benzothiazole sulfenamide, and a combination thereof.

Examples of the thiazole-based vulcanization accelerator may include any one thiazole-based compound selected from the group consisting of 2-mercaptobenzothiazole (MBT), dibenzothiazyl disulfide (MBTS), a sodium salt of 2-mercaptobenzothiazole, a zinc salt of 2-mercaptobenzothiazole, a copper salt of 2-mercaptobenzothiazole, a cyclohexylamine salt of 2-mercaptobenzothiazole, 2-(2,4-dinitrophenyl) mercaptobenzothiazole, 2-(2,6-diethyl-4-morpholinothio) benzothiazole, and a combination thereof.

Examples of the thiuram-based vulcanization accelerator may include any one thiuram-based compound selected from the group consisting of tetramethylthiuram disulfide (TMTD), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide, pentamethylene thiuram tetrasulfide, and a combination thereof.

Examples of the thiourea-based vulcanization accelerator may include any one thiourea-based compound selected from the group consisting of thiocarbamide, diethyl thiourea, dibutyl thiourea, trimethyl thiourea, diorthotolyl thiourea, and a combination thereof.

Examples of the guanidine-based vulcanization accelerator may include any one guanidine-based compound selected from the group consisting of diphenylguanidine, diorthotolyl guanidine, triphenyl guanidine, orthotolyl biguanide, diphenylguanidine phthalate, and a combination thereof.

Examples of the dithiocarbamate-based vulcanization accelerator may include any one dithiocarbamate-based compound selected from the group consisting of zinc ethylphenyldithiocarbamate, zinc butylphenyldithiocarbamate, sodium dimethyldithiocarbamate, zinc dimethyldithiocarbamate, zinc diethyldithiocarbamate, zinc dibutyldithiocarbamate, zinc diamyldithiocarbamate, zinc dipropyldithiocarbamate, a complex salt of zinc pentamethylenedithiocarbamate and piperidine, zinc hexadecylisopropyldithiocarbamate, zinc octadecylisopropyldithiocarbamate, zinc dibenzyldithiocarbamate, sodium diethyldithiocarbamate, piperidine pentamethylenedithiocarbamate, selenium dimethyldithiocarbamate, tellurium diethyldithiocarbamate, cadmium diamyldithiocarbamate, and a combination thereof.

Examples of the aldehyde amine-based or aldehyde ammonia-based vulcanization accelerator may include an aldehyde amine-based or aldehyde ammonia-based compound selected from the group consisting of an acetaldehyde-aniline reactant, a butyl aldehyde-aniline condensate, hexamethylenetetramine, an acetaldehyde-ammonia reactant, and a combination thereof.

Examples of the imidazoline-based vulcanization accelerator may include an imidazoline-based compound such as 2-mercaptoimidazoline or the like, and examples of the xanthate-based vulcanization accelerator may include a xanthate-based compound such as zinc dibutylxanthate or the like.

The vulcanization accelerator may be included in an amount of 1.0 to 2.5 parts by weight with respect to 100 parts by weight of the raw material rubber to maximize enhancement of productivity and enhancement of rubber properties through acceleration of the vulcanization rate.

The antiaging agent is an additive which is used to stop a chain reaction in which a tire is automatically oxidized by oxygen. The antiaging agent may include any one suitably selected from the group consisting of an amine-based antiaging agent, a phenol-based antiaging agent, a quinolone-based antiaging agent, an imidazole-based antiaging agent, a carbamate metal salt, wax, and a combination thereof.

The amine-based antiaging agent may be any one selected from the group consisting of N-phenyl-N'-(1,3-dimethyl)-p-phenylenediamine, N-(1,3-dimethylbutyl)-N'-phenyl-p-phenylenediamine (6PPD), N-phenyl-N'-isopropyl-p-phenylenediamine (3PPD), N,N'-diphenyl-p-phenylenediamine, N,N'-diaryl-p-phenylenediamine, N-phenyl-N'-cyclohexyl-p-phenylenediamine, N-phenyl-N'-octyl-p-phenylenediamine, and a combination thereof. The phenol-based antiaging agent may be any one selected from the group consisting of 2,2'-methylene-bis(4-methyl-6-tert-butylphenol), 2,2'-isobutylidene-bis(4,6-dimethylphenol), 2,6-di-tert-butyl-p-cresol, and a combination thereof. Examples of the quinolone-based antiaging agent may include 2,2,4-trimethyl-1,2-dihydroquinoline and its derivatives, and specifically may be any one selected from the group consisting of 6-ethoxy-2,2,4-trimethyl-1,2-dihydroquinoline, 6-anilino-2,2,4-trimethyl-1,2-dihydroquinoline, 6-dodecyl-2,2,4-trimethyl-1,2-dihydroquinoline, and a combination thereof. The wax may preferably be a waxy hydrocarbon.

The antiaging agent may be included in an amount of 1 to 5 parts by weight with respect to 100 parts by weight of the raw material rubber considering conditions that the antiag ing agent should have high solubility in rubber in addition to an antiaging effect, should be low in volatility and inactive to rubber, and should not hinder vulcanization.

In the present disclosure, various additives such as zinc oxide, stearic acid, a processing aid and the like which are used in a common tire tread composition besides the above-mentioned compositions may be selectively used as necessary.

Furthermore, another aspect of the present disclosure provides a tire manufactured using the rubber composition for the tire tread.

The rubber composition for the tire tread may be prepared through a general continuous preparation process of two steps. That is, the rubber composition for the tire tread may be prepared in a suitable mixer through a first step of performing a thermomechanical treatment or kneading process at a maximum temperature ranging from 110 to 190° C., preferably at a high temperature of 130 to 180° C., and a second step of performing a mechanical treatment process typically at less than 110° C., e.g., at a low temperature of 40 to 100° C. during a finishing step of mixing a cross-linking system. However, the present disclosure is not limited thereto.

The rubber composition for the tire tread is not limited to a tread (a tread cap and a tread base), but may be included in various rubber components composing the tire. The rubber components may include a sidewall, a sidewall insert, an apex, a chafer, a wire coat, an inner liner, or others.

A tire according to another embodiment of the present inventive concept is manufactured using the rubber composition for the tire tread. Any methods can be applied as a method of manufacturing the tire using the rubber composition for the tire tread if the methods are an existing method which is used in manufacturing of the tire. Accordingly, detailed descriptions are omitted in the present specification.

The tire may be a light truck radial (LTR) tire, an ultra-high performance (UHP) tire, a racing tire, an off-road tire, a car tire, an airplane tire, an agricultural tire, a truck tire, a bus tire or the like. Further, the tire is may be a radial tire or a bias tire, and is preferably the radial tire.

Hereinafter, exemplary embodiments of the present inventive concept will be described in detail to enable those skilled in the art to easily implement the present inventive concept. However, the present inventive concept can be implemented in various different forms and is not limited to the embodiments described herein.

Preparation Example 1: Preparing Rubber Compositions

Rubber compositions for tire treads according to the following Examples and Comparative Examples were prepared using compositions as shown in the following Table 1. The rubber compositions were prepared by a general method of preparing the rubber composition.

TABLE 1

|  | Comparative Example 1 | Comparative Example 2 | Comparative Example 3 | Example 1 | Example 2 | Example 3 |
| --- | --- | --- | --- | --- | --- | --- |
| NR | 10 | 10 | 10 | 10 | 10 | 10 |
| S-SBR | 55 | 55 | 55 | 55 | 55 | 55 |
| BR | 35 | 35 | 35 | 35 | 35 | 35 |
| Vegetable oil | 20 | 20 | 20 | 20 | 20 | — |
| Synthetic oil | — | — | — | — | — | 20 |
| Resin | 5 | 10 | 20 | 30 | — | — |
| Carbon black | 10 | 10 | 10 | 10 | 10 | 10 |
| Silica | 90 | 90 | 90 | 90 | 90 | 90 |
| Coupling agent | 15 | 15 | 15 | 15 | 15 | 15 |
| Antiaging agent | 6 | 6 | 6 | 6 | 6 | 6 |
| Vulcanizing agent | 0.7 | 0.7 | 0.7 | 0.7 | 0.7 | 0.7 |
| Accelerator | 2.3 | 2.3 | 2.3 | 2.3 | 2.3 | 2.3 |

1) NR: Natural rubber cis-1,4-polyisoprene
2) S-SBR: Solution polymerized styrene-butadiene rubber (SBR) including 35 wt % of styrene, 25 wt % of vinyl in butadiene and 37.5 wt % of SRAE oil, and having a glass transition temperature Tg of −35° C.
3) BR: Butadiene rubber prepared using a neodymium catalyst
4) Vegetable oil: Oil prepared by mixing sunflower oil having 15 wt % or less of the total content of linolenic acid components and 85 wt % or less of the total content of oleic acid components with soybean oil having 60 wt % or less of the total content of linolenic acid components and 30 wt % or less of the total content of oleic acid components, the oil obtained by mixing the sunflower oil with the soybean oil having a content ratio of linolenic acid to oleic acid of 1:1.5
5) Synthetic oil: Synthetic oil having 3 wt % or less of the total content of polycyclic aromatic hydrocarbon (PAH) components and 43° C. (210° F. SUS) of a kinematic viscosity, and including 10 wt % of an aromatic component, 40 wt % of a naphthenic component and 40 wt % of a paraffinic component in the softener
6) Resin: Terpene-based resin having a softening point of 120° C.
7) Carbon black: Carbon black having having a nitrogen surface area per gram of 160 $m^2$/g and a DBP oil absorption amount of 140 cc/100 g
8) Silica: Precipitated silica having a nitrogen surface area per gram of 175 $m^2$/g and a CTAB value of 160 $m^2$/g Experimental Example 1: Measuring Physical Properties of Prepared Rubber Compositions After measuring physical properties for rubber samples manufactured in Examples and Comparative Examples, measurement results are shown in the following Table 2.

After measuring Mooney viscosity, hardness, 300% modulus, viscoelasticity and the like with respect to obtained samples in accordance with related regulations of ASTM, measurement results are shown in Table 2.

TABLE 2

|  | Example 1 | Example 2 | Example 3 | Comparative Example 1 | Comparative Example 2 | Comparative Example 3 |
|---|---|---|---|---|---|---|
| Mooney viscosity | 75 | 74 | 72 | 69 | 75 | 80 |
| Hardness (Shore A) | 69 | 69 | 68 | 68 | 68 | 70 |
| 300% modulus | 86 | 85 | 84 | 81 | 87 | 89 |
| Breaking energy | 594 | 598 | 607 | 615 | 593 | 552 |
| Tg (° C.) | −31 | −30 | −28 | −26 | −33 | −25 |
| −40° C. G' | 1.80E+08 | 1.90E+08 | 2.10E+08 | 2.30E+08 | 1.70E+08 | 2.90E+08 |
| 0° C. tanδ | 0.213 | 0.220 | 0.243 | 0.251 | 0.212 | 0.200 |
| 60° C. tanδ | 0.129 | 0.131 | 0.132 | 0.137 | 0.130 | 0.127 |

Mooney viscosity (ML1 + 4(125° C.)) values were measured in accordance with ASTM standard D1646.
Hardness values were measured in accordance with DIN 53505.
300% modulus and breaking energy values were measured in accordance with ISO 37 standard.
G', G" and tanδ as viscoelasticity values were measured at 0.5% strain in a temperature range of −60° C. to 60° C. under 10 Hz frequency by using an RDS measuring device.

Mooney viscosity is a value showing viscosity of unvulcanized rubber, and the lower a numerical value of Mooney viscosity is, the more excellent processability of the unvulcanized rubber is. Hardness shows handling stability, and the higher a hardness value is, the more excellent the handling performance is. Breaking energy shows energy required when rubber is broken, and the higher a breaking energy value is, the more excellent wear performance is since the required energy is high. Tg and −40° C. G' show braking properties on the ice and snow road surface, and the lower numerical values of Tg and −40° C. G' are, the more excellent braking property values are. 0° C. tan δ shows braking properties on a dry road surface or wet road surface, and the higher a numerical value of 0° C. tan δ is, the more excellent braking performance value is. Further, 60° C. tan δ shows rotational resistance properties, and the lower a numerical value of 60° C. tan δ is, the more excellent a rotational resistance performance value is.

After manufacturing treads using the rubbers of Comparative Examples and Examples and manufacturing 215/60R16V standardized tires including the tread rubbers as semi-finished products, relative ratio values of low fuel consumption performance in accordance with braking distance, rotational resistance and abrasion resistant performance for the tires on the wet road surface or the ice and snow road surface are shown in Table 3. The relative ratio values have a great effect on improvement or reduction in the braking distance, rotational resistance and abrasion resistant performance when the relative ratio values have a variation width of 5% or more. That is, the braking distance, rotational resistance and abrasion resistant performance values are levels at which it is difficult to apply the rubber compositions to the tire treads due to insufficient performance values of the tires when the braking distance, rotational resistance and abrasion resistant performance values are 95 or less. The braking distance, rotational resistance and abrasion resistant performance values are levels which exhibit a significant effect of improving performance when the braking distance, rotational resistance and abrasion resistant performance values are 105 or more.

TABLE 3

|  | Example 1 | Example 2 | Example 3 | Comparative Example 1 | Comparative Example 2 | Comparative Example 3 |
|---|---|---|---|---|---|---|
| Rotational resistance | 98 | 97 | 97 | 94 | 97 | 100 |
| Braking performance on the wet road surface | 100 | 102 | 106 | 108 | 98 | 100 |
| Braking performance on the ice and snow road surface | 107 | 106 | 103 | 99 | 108 | 100 |
| Abrasion resistant performance | 110 | 108 | 105 | 99 | 115 | 100 |

Referring to Table 2 and Table 3, it could be confirmed that braking performance values on the ice and snow road surface or the wet road surface were uniformly excellent in Examples 1 to 3 simultaneously using the vegetable oil and the terpene-based resin compared to Comparative Examples 2 and 3 which do not include the terpene-based resin. However, although a braking performance effect is excellent in Comparative Example 1 including more than 20 parts by weight of the terpene-based resin, there is a trade-off phenomenon that effects of the braking performance on the ice and snow road surface and the abrasion resistant performance are lowered in Comparative Example 1.

Preparation Example 2: Preparing Rubber Compositions Having Changed Ratios of Linolenic Acid to Oleic Acid Rubber compositions were prepared by the same method as in Preparation Method 1 except that contents of linolenic acid and oleic acid in the vegetable oil were varied as in the following Table 4. Preparation processes of different rubber compositions was performed under the same conditions as in Example 2.

TABLE 4

|  | Example 4 | Example 5 | Example 6 | Comparative Example 4 | Comparative Example 5 |
|---|---|---|---|---|---|
| Linolenic acid | 1 | 1 | 1 | 1 | 1 |
| Oleic acid (Weight ratio) | 0.5 | 1 | 1.5 | 2 | 5 |

Experimental Example 2: Measuring Physical Properties of Prepared Rubber Compositions After measuring physical properties for rubber samples manufactured in Examples and Comparative Examples, measurement results are shown in the following Table 5. A method of measuring the physical properties was carried out in the same manner as in Experimental Example 1.

TABLE 5

|  | Example 4 | Example 5 | Example 6 | Comparative Example 4 | Comparative Example 5 |
|---|---|---|---|---|---|
| Rotational resistance | 99 | 100 | 100 | 100 | 101 |
| Braking performance on the wet road surface | 98 | 99 | 100 | 101 | 100 |
| Braking performance on the ice and snow road surface | 107 | 105 | 100 | 99 | 99 |
| Abrasion resistant performance | 108 | 105 | 100 | 100 | 99 |

Referring to Table 5, it could be confirmed that braking performance values on the ice and snow road surface and abrasion resistant performance values were remarkably improved without lowering rotational resistance values or braking performance values on the wet road surface in Examples 4 to 6 having content ratios of linolenic acid to oleic acid of 1:0.5, 1:1 and 1:1.5 respectively compared to Comparative Example 4 and 5 including more than 1.5 parts by weight of oleic acid.

Hereinabove, preferred embodiments of the present inventive concept have been described in detail. However, the scope of the right of the present invention is not limited thereto. The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A rubber composition for a tire tread, the rubber composition comprising:
    100 parts by weight of a raw material rubber;
    10 to 30 parts by weight of a vegetable oil having a weight ratio of linolenic acid to oleic acid of 1:0.5 to 1:1.5 with respect to 100 parts by weight of the raw material rubber;
    10 to 20 parts by weight of a terpene-based resin having a softening point of 110 to 130° C. with respect to 100 parts by weight of the raw material rubber;
    75 to 120 parts by weight of a reinforcing filler with respect to 100 parts by weight of the raw material rubber,
    wherein the raw material rubber includes 5 to 20 wt % of a natural rubber, 40 to 70 wt % of a solution polymerized styrene-butadiene rubber, and 20 to 40 wt % of a neodymium butadiene rubber with respect to 100 parts by weight of the raw material rubber; and
    wherein the reinforcing filler includes 70 to 100 parts by weight of silica and 5 to 20 parts by weight of carbon black with respect to 100 parts by weight of the raw material rubber, the silica comprising a high dispersible silica having a nitrogen surface area per gram of 160 to 180 $m^2/g$, a CTAB value of 150 to 170 $m^2/g$, and a DBP oil absorption amount of 180 to 200 cc/100 g, and wherein the carbon black has a nitrogen surface area per gram of 30 to 300 $m^2/g$ and a DBP oil absorption amount of 60 to 180 cc/100 g.

2. The rubber composition for the tire tread of claim 1, wherein the solution polymerized styrene-butadiene rubber includes 20 to 50 wt % of styrene, 10 to 40 wt % of vinyl and 20 to 40 wt % of an SRAE oil and has a glass transition temperature of −50 to −20° C., and the neodymium butadiene rubber includes 94 to 96 wt % of cis and has a glass transition temperature of −110 to −100° C.

3. The rubber composition for the tire tread of claim 1, wherein the vegetable oil is any one selected from the group consisting of sunflower oil, soybean oil, canola oil, grape seed oil, and a mixture thereof, and includes 60 to 90 wt % of an unsaturated fatty acid with respect to the total weight of the vegetable oil.

4. The rubber composition for the tire tread of claim 1, wherein the terpene-based resin is any one selected from the group consisting of a terpene resin, a terpene phenol resin, and a combination thereof, and has a weight average molecular weight of 40 to 20,000 g/mol.

5. The rubber composition for the tire tread of claim 1, further comprising 0.5 to 2.0 parts by weight of a vulcanizing agent, 1.0 to 2.5 parts by weight of a vulcanization accelerator, and 1 to 5 parts by weight of an antiaging agent with respect to 100 parts by weight of the raw material rubber.

6. A tire manufactured using the rubber composition for the tire tread according to claim 1.

* * * * *